(12) United States Patent
Jacobson et al.

(10) Patent No.: US 6,740,441 B2
(45) Date of Patent: May 25, 2004

(54) METAL CURRENT COLLECT PROTECTED BY OXIDE FILM

(75) Inventors: Craig P. Jacobson, Lafayette, CA (US); Steven J. Visco, Berkeley, CA (US); Lutgard C. DeJonghe, Lafayette, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 10/323,136

(22) Filed: Dec. 18, 2002

(65) Prior Publication Data

US 2003/0170544 A1 Sep. 11, 2003

Related U.S. Application Data (60) Provisional application No. 60/343,330, filed on Dec. 18, 2001.

(51) Int. Cl.[7] .............................................. H01M 8/10
(52) U.S. Cl. ............................. 429/30; 429/31; 429/32; 429/34; 429/233; 429/236; 429/237; 429/241; 429/245; 55/523
(58) Field of Search .......................... 429/30, 236, 241, 429/245, 34, 233, 31, 32, 237; 55/523

(56) References Cited

U.S. PATENT DOCUMENTS

| 5,035,962 A | 7/1991 | Jensen |
| 5,160,618 A | 11/1992 | Burggraaf et al. |

(List continued on next page.)

FOREIGN PATENT DOCUMENTS

| EP | 399833 A1 | 11/1990 |
| EP | 0476808 | 3/1992 |
| EP | 0497542 | 8/1992 |
| EP | 0513982 | 11/1992 |
| EP | 0524013 | 1/1993 |
| EP | 0 111 214 | 1/1998 |
| GB | 1 383 343 A | 12/1974 |
| WO | WO 97 00734 A | 9/1997 |

OTHER PUBLICATIONS

Yao, et al., Sensors and Actuators A 71, Received Dec. 9, 1997; received in revised form Apr. 27, 1998; accepted May 1, 1998, pp. 139–143.
Fujii, K., et al., Bulletin of the Electrotechnical Laboratory, vol. 62, No. 1–2, 1998, pp. 1319.
Momma, et al., Electrochemical Laboratory, Electrochemical Proceedings vol. 97–40, Jun. 1997, pp. 310–321.
Okuo, et al., Electrotechnical Laboratory, Oct. 1994, pp. 908–919.
Okua, T., et al., vol. 60, No. 5, 1996 pp. 1–9.
Schiller, G., et al., Electrochemical Society Proceedings vol. 99–19, Oct. 1999, pp. 892–903.
Schiller, G., et al., Electrochemical Proceedings vol. 97–40, Oct. 1999, pp. 634–645.
Schiller, G., et al., 1998, pp. 515–518.
Takenoiri, et al., Fuel Cell Seminar Abstracts, Nov. 1998, pp. 84–87.

(List continued on next page.)

*Primary Examiner*—Laura Weiner
(74) *Attorney, Agent, or Firm*—Charles R. Nold; Lawrence Berkeley National Laboratory (57) ABSTRACT

Provided are low-cost, mechanically strong, highly electronically conductive current collects and associated structures for solid-state electrochemical devices, techniques for forming these structures, and devices incorporating the structures. The invention provides solid state electrochemical devices having as current interconnects a ferritic steel felt or screen coated with a protective oxide film.

19 Claims, 4 Drawing Sheets

U.S. PATENT DOCUMENTS

| | | |
|---|---|---|
| 5,169,811 A | 12/1992 | Cipollini et al. |
| 5,219,673 A | 6/1993 | Kaun |
| 5,240,480 A | 8/1993 | Thorogood et al. |
| 5,286,322 A | 2/1994 | Armstrong et al. |
| 5,314,765 A | 5/1994 | Bates |
| 5,328,779 A | 7/1994 | Tannenberger et al. |
| 5,338,625 A | 8/1994 | Bates et al. |
| 5,342,705 A | 8/1994 | Minh et al. |
| 5,342,710 A | 8/1994 | Koksbang |
| 5,356,730 A | 10/1994 | Minh et al. |
| 5,366,770 A | 11/1994 | Wang |
| 5,455,126 A | 10/1995 | Bates et al. |
| 5,480,739 A | 1/1996 | Kawasaki et al. |
| 5,512,147 A | 4/1996 | Bates et al. |
| 5,532,071 A | 7/1996 | Pal et al. |
| 5,538,814 A | 7/1996 | Kamauchi et al. |
| 5,567,210 A | 10/1996 | Bates et al. |
| 5,569,520 A | 10/1996 | Bates |
| 5,589,017 A | 12/1996 | Minh |
| 5,589,285 A | 12/1996 | Cable et al. |
| 5,597,660 A | 1/1997 | Bates et al. |
| 5,612,152 A | 3/1997 | Bates |
| 5,648,487 A | 7/1997 | Beriger et al. |
| 5,670,270 A | 9/1997 | Wallin |
| 5,686,201 A | 11/1997 | Chu |
| 5,725,965 A | 3/1998 | Wachsman et al. |
| 5,788,788 A | 8/1998 | Minh |
| 5,814,420 A | 9/1998 | Chu |
| 5,824,434 A | 10/1998 | Kawakami et al. |
| 5,882,809 A | 3/1999 | McPheeters et al. |
| 5,932,368 A | 8/1999 | Batawi et al. |
| 5,938,822 A | 8/1999 | Chen et al. |
| 5,985,476 A | 11/1999 | Wachsman et al. |
| 5,993,985 A | 11/1999 | Borglum |
| 5,993,986 A | 11/1999 | Wallin et al. |
| 6,025,094 A | 2/2000 | Visco et al. |
| 6,051,173 A | 4/2000 | Fasano et al. |
| 6,051,330 A | 4/2000 | Fasano et al. |
| 6,228,520 B1 | 5/2001 | Chaio |
| 6,358,567 B2 | 3/2002 | Pham et al. |
| 6,368,383 B1 | 4/2002 | Virkar et al. |
| 6,458,170 B1 | 10/2002 | Visco et al. |
| 2002/0012576 A1 | 1/2002 | Christiansen |
| 2002/0048699 A1 | 4/2002 | Steele et al. |

OTHER PUBLICATIONS

OTHER PUBLICATIONS

Unal, et al., Department of Materials Science and Engineering, vol. 984–92, 1994, pp. 984–992.

Wallin et al., "Cofired Solid Oxide Fuel Cells for Operation at 800° C" 1997, Abstract only.

Seabaugh, et al., NexTech Materials, Ltd.; Fuel Cells 2000 Conference in Portland OR. Oct. 30, 2000–Nov. 2, 2000.

Iconell 600 Trade Data Sheet—wwww.hpalloy.com/Data Sheets/600.html Jun. 5, 2002—Note: Probably posted on web earlier.

METAL CURRENT COLLECT PROTECTED BY OXIDE FILM

CROSS REFERENCE TO RELATED APPLICATIONS

This applications claims priority to U.S. Ser. No. 60/343,330, filed Dec. 18, 2001, the contents which are hereby incorporated by reference in its entirety for all purposes.

STATEMENT REGARDING FEDERALLY SPONSORED RESEARCH OR DEVELOPMENT

This invention was made with government support under Grant (Contract) No. DE-AC03-76F00098 awarded by The United States Department of Energy. The government has certain rights to this invention.

BACKGROUND OF THE INVENTION

The present invention relates generally to the field of solid state electrochemical devices, and more particularly to cell to cell interconnects used therein. Interconnects of the prior art are typically made of metal or metal alloys or of an oxide such as doped lanthanum chromite and are typically about 0.2 mm thick. Interconnects may also serve as current collectors for solid state electrochemical devices.

Current collectors for solid state electrochemical devices have been described in the prior art, for example in Hatchwell et al., *J. Power Sources*, 70 (1998) 85–90, the contents of which are hereby incorporated by reference in their entirety.

Solid state electrochemical devices are often used as cells and include two porous electrodes, the anode and the cathode, and a dense solid electrolyte and/or membrane which separates the electrodes. For the purposes of this application, unless otherwise explicit or clear from the context in which it is used, the term "electrolyte" should be understood to include solid oxide membranes used in electrochemical devices, whether or not potential is applied or developed across them during operation of the device. In many implementations, such as in fuel cells and oxygen and syn gas generators, the solid membrane is an electrolyte composed of a material capable of conducting ionic species, such as oxygen ions, or hydrogen ions, yet has a low electronic conductivity. In other implementations, such as gas separation devices, the solid membrane is composed of a mixed ionic electronic conducting material ("MIEC"). In each case, the electrolyte/membrane must be dense and pinhole free ("gas-tight") to prevent mixing of the electrochemical reactants. In all of these devices a lower total internal resistance of the cell improves performance.

The ceramic materials used in conventional solid state electrochemical device implementations can be expensive to manufacture, difficult to maintain (due to their brittleness) and have inherently high electrical resistance. The resistance may be reduced by operating the devices at high temperatures, typically in excess of 900° C. However, such high temperature operation has significant drawbacks with regard to the device maintenance and the materials available for incorporation into a device, particularly in the oxidizing environment of an oxygen electrode, for example.

The preparation of solid state electrochemical cells is well known. For example, a typical solid oxide fuel cell (SOFC) is composed of a dense electrolyte membrane of a ceramic oxygen ion conductor, a porous anode layer of a ceramic, a metal or, most commonly, a ceramic-metal composite ("cermet"), in contact with the electrolyte membrane on the fuel side of the cell, and a porous cathode layer of a mixed ionically/electronically-conductive (MIEC) metal oxide on the oxidant side of the cell. Electricity is generated through the electrochemical reaction between a fuel (typically hydrogen produced from reformed methane) and an oxidant (typically air). This net electrochemical reaction involves charge transfer steps that occur at the interface between the ionically-conductive electrolyte membrane, the electronically-conductive electrode and the vapor phase (fuel or oxygen). The contributions of charge transfer step, mass transfer (gas diffusion in porous electrode), and ohmic losses due to electronic and ionic current flow to the total internal resistance of a solid oxide fuel cell device can be significant. Moreover, in typical device designs, a plurality of cells are stacked together and connected by one or more interconnects. Resistive loss attributable to these interconnects can also be significant. It is the subject of this invention to provide new and improved interconnects.

In work reported by de Souza, Visco, and De Jonghe (de Souza, S.; Visco, S. J.; De Jonghe, L. C. Reduced-temperature solid oxide fuel cell based on YSZ thin-film electrolyte. *Journal of the Electrochemical Society*, vol.144, (no.3), Electrochem. Soc, March 1997. p.L35–7. 7), the contents of which are incorporated by reference in their entirety for all purposes, a thin film of yttria stabilized zirconia (YSZ) is deposited onto a porous cermet electrode substrate and the green assembly is co-fired to yield a dense YSZ film on a porous cermet electrode. A thin cathode is then deposited onto the bilayer, fired, and the assembly is tested as an SOFC with good results. In work reported by Minh (Minh, N. Q. (Edited by: Dokiya, M.; Yamamoto, O.; Tagawa, H.; Singhal, S. C.) Development of thin-film solid oxide fuel cells for power generation applications. Proceedings of the Fourth International Symposium on Solid Oxide Fuel Cells (SOFC-IV), (Proceedings of the Fourth International Symposium on Solid Oxide Fuel Cells (SOFC-IV), Proceedings of Fourth International Symposium Solid Oxide Fuel Cells, Yokohama, Japan, 18–23 Jun. 1995.) Pennington, N.J., USA: Electrochem. Soc, 1995. p. 138–45), a similar thin-film SOFC is fabricated by tape calendaring techniques to yield a good performing device.

Solid state electrochemical devices are becoming increasingly important for a variety of applications including energy generation, oxygen separation, hydrogen separation, coal gasification, and selective oxidation of hydrocarbons. These devices are typically based on electrochemical cells with ceramic electrodes and electrolytes and have two basic designs: tubular and planar. Tubular designs have traditionally been more easily implemented than planar designs, and thus have been preferred for commercial applications. However, tubular designs provide less power density than planar designs due to their inherently relatively long current path that results in substantial resistive power loss. Planar designs are theoretically more efficient than tubular designs, but are generally recognized as having significant safety and reliability issues due to the complexity of sealing and manifolding a planar stack.

The current collectors of the prior art, see U.S. Pat. No. 6,214,061, the contents of which are hereby incorporated by reference in their entirety, form a physically rigid layer of material. U.S. Pat. No. 3,377,203 discloses a method for producing fuel cells of solid electrolyte and ceramic oxide electrode layers by sintering the electrode layers to the electrolyte. U.S. Pat. No. 4,767,518 discloses a solid oxide electrode (anode) made of metal particles that are immobilized by stabilized zirconia which may also contain praseodymium (Pr). The Pr may be added in the form of a solution. U.S. Pat. No. 4,885,078 discloses an electrochemical device which may be a solid oxide cell which comprises a porous electrode containing a deposit of metal oxide or metal salt capable of forming metal oxide upon heating, where the metal may be Pr. U.S. Pat. No. 5,021,304 discloses a method of coating a separate electronically conducted layer on a porous electrode having the steps of applying a mixture of metal salts including nitrates to the electrodes with a surfactant, and heating to form the oxides. Pr oxide is included in a list of dopant oxides which may be used. U.S. Pat. No. 6,416,897 discloses tubular screen electrical connection supports for solid oxide fuel cells comprising porous, hollow, electrically conducting metal mesh conductors between fuel cells that are made of nickel. U.S. Pat. No. 5,258,240 discloses electrical connectors for fuel cells comprising felts or foils.

The total amount of energy produced by a solid state fuel cell can be increased by stacking the cells anode to cathode. Interconnect layers are placed between the anode and cathode layers of adjacent cells to provide electrical connection from cell to cell and to serve as a barrier between the cells to prevent the migration of fuel or oxidant therebetween.

SUMMARY OF THE INVENTION

This invention contemplates a novel cell to cell interconnect and current collector and process of making such devices useful for cell to cell interconnection at high temperatures, i.e. greater than 600 degrees centigrade. This invention contemplates devices comprising stacks of plates or bundles of tubes which are electrically connected. Typical prior art devices are connected in series and/or parallel by expensive metal oxides or by expensive metals such as Pt or Ni (reducing atmosphere). The interconnect and current collectors of this invention are comprised of a metal screen or metal felt coated with a perovskite.

In other aspects, the invention provides devices in accordance with the present invention tailored to specific purposes, for example, oxygen generators, gas separators, solid oxide fuel cells and syn gas generators.

These and other features and advantages of the present invention will be presented in more detail in the following specification of the invention and the accompanying figures which illustrate by way of example the principles of the invention.

BRIEF DESCRIPTION OF THE DRAWINGS

The present invention will be readily understood by the following detailed description in conjunction with the accompanying drawing.

DETAILED DESCRIPTION OF THE INVENTION

Reference will now be made in detail to some specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well known process operations have not been described in detail in order not to unnecessarily obscure the present invention.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this invention belongs.

Introduction

An overview of solid state device components and construction, and the two basic designs follows. This description is provided both by way of background and introduction to the subject, and to provide design and fabrication details that may be adopted in compositions, devices, and methods in accordance with the present invention.

Figure 1:
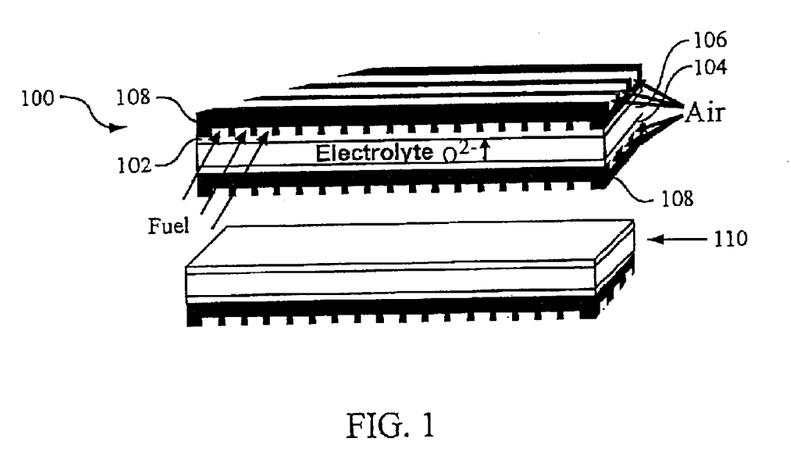
FIG. 1 depicts a planar design for a solid state electrochemical device.

FIG. 1 illustrates a basic planar design for a solid state electrochemical device, for example, a solid oxide fuel cell (SOFC). The cell 100 includes an anode 102 (the "fuel electrode") and a cathode 104 (the "air electrode") and a solid electrolyte 106 separating the two electrodes. In conventional SOFCs, the electrodes and electrolytes are typically formed from ceramic materials, since ceramics are able to withstand the high temperatures at which the devices are operated. For example, SOFCs are conventionally operated at about 950° C. This operating temperature is determined by a number of factors, in particular, the temperature required for the reformation of methane to produce hydrogen and reaction efficiency considerations. Also, typical solid state ionic devices such as SOFCs have a structural element onto which the SOFC is built. In conventional planar SOFCs the structural element is a thick solid electrolyte plate such as yttria stabilized zirconia (YSZ); the porous electrodes are then screen-printed onto the electrolyte. The porous electrodes are of low strength and are not highly conductive. Alternatively, a thick porous electrode and a thin electrolyte membrane can be co-fired, yielding a electrode/electrolyte bilayer. As noted above, for the case where the electrode is a Ni-YSZ electrode of a few mm in thickness, the electrode strength is low and the cost of raw materials high. Cell to cell interconnect is shown in 108.

Methane (natural gas) is plentiful, inexpensive, and rich in hydrogen, the actual fuel for the cell, and as such, is the preferred fuel source for a SOFC. Methane may be reformed to produce hydrogen at a temperature of about 650–950° C. Therefore, it is desirable to operate a SOFC at at least the lower end of this temperature range.

Another consideration governing the temperature at which a SOFC or any solid state electrochemical device is operated is the electrolyte/membrane conductivity. Conventional devices must be operated at a high enough temperature to make the ceramic electrolyte sufficiently ionically conductive for the energy producing reactions (in the case of a SOFC; other reactions for gas separators or generators). The thickness of the solid electrolyte, typically hundreds of microns thick, favors an operating temperature above 900° C. in order to achieve an acceptable conductivity. Methods exist for forming thin electrolytes on ceramic substrates, such as EVD/CVD. However, EVD/CVD is a complex and expensive technique, and the ceramic-based devices to which the technique has been applied still require high operating temperatures to be at all efficient. Unfortunately, most metals are not stable at this temperature in an oxidizing environment and very quickly become converted to brittle oxides. Accordingly, solid state electrochemical devices have conventionally been constructed of heat-tolerant ceramic materials, such as $La_{1-x}Sr_xMn_yO_{3-\delta}$ ($1 \geq X \geq 0.05$) ($0.95 \leq y \leq 1.15$) ("LSM"), and yttria stabilized zirconia (e.g., $(ZrO_2)_{0.92}(Y_2O_3)_{0.08}$) ("YSZ"). In an SOFC, this limitation is most problematic at the air electrode where oxidation can take place. In other solid state electrochemical devices, such as oxygen generators, both electrodes may be in an oxidizing environment during operation of the device, and so both may face this problem.

Referring again to FIG. 1, the cell 100 is depicted in the form in which it could be stacked with other like cells 110, as it typically would be to increase the capacity of the device. To be stacked, the cells require bipolar interconnects 108 adjacent to each electrode that are electrically, but not ionically, conductive.

This invention contemplates a novel method of current collection and devices useful for cell to cell interconnection at high temperatures, i.e. greater than 600 degrees centigrade. This invention contemplates devices comprising stacks of plates or bundles of tubes which are electrically connected. Typical prior art devices are connected in series and/or parallel by expensive metal oxides or by expensive metals such as Pt or Ni (reducing atmosphere). This invention contemplates a solution to the above stated problems by coating a metal screen or metal felt that may comprise ferritic steels with a thin protective oxide film, comprising a material such as a perovskite, $LaCrO_3$ or $La_{1-x}Sr_xCrO_3$. The material may be applied by any technique known in the art, such as CVD or PVD or Sol Gel, etc. The "coated screens" or "coated felts" contemplated by this invention are useful as current collects. This invention contemplates the coated articles of this invention to be useful in metal supported devices but also in ceramic or cermet supported SOFC. There is of particular use for large cells (i.e. 1m×1m plate) where the current path is long.

It is contemplated that stacks of planar SOFCs can be stacked by pressing, etc with Ni felt current collects on the anode side and metal felt (for example FeCr+ protective oxide scale or FeCrNi+protective oxide scale) current collects on the cathode side. Also contemplated is a Ni plating on FeCr based alloys. This serves as a catalyst in the fuel side without the expense of using pure Ni. Ceria can also be added to the surface of the Ni plating or any other catalyst such as Cu, etc.

The metal screen or metal felt may comprise substantially inexpensive ferritic steels and is coated with a thin protective oxide film. Metal oxides are preferred. The thin oxide film or oxide precursor coated on the metal screen or felt substrate is heated in an oxidizing atmosphere at temperatures in excess of 400 degrees centigrade. This oxidation can occur in the heat up of the device. The coated metal contacts one cell of an electrochemical device and at least one other cell. The thin film prevents excessive oxidation of the underlying metal while providing electrical connection between the metal and the electrode of the electrochemical device at temperatures in excess of 600 degree centigrade. $La_{1-x}Sr_xCrO_3$ is described in M. D. Vlajic, V. D. Krstić, *Center for Advanced Ceramics and Nanocrystalline Materials*, Queen's University Kingston, Ontario, Canada, *SINTERING AND PROPERTIES OF LaSrCrO$_3$*, presented at the Fourth Yugoslav Material Research society Conference, Herceg-Novi, Sep. 10–14, 2001, the contents of which are hereby incorporated by reference in its entirety.

Perovskites are a large family of crystalline ceramics that derive their name from a specific mineral known as perovskite. The principle perovskite structure found in ferroelectric materials is a simple cubic structure containing three different ions of the form $ABO_3$ or $A_{1-x}A'_xB_{1-y}B'_yO_3$ wherein A is a Lanthanide series element, A' is Ba, Ca or Sr, B is Cr and B' is chosen from the following elements: Fe, Co, Ni, Cu, V, Ti, Mn, Ce, Ta, In, and Al, and where $0 \leq x \leq 1$ and $0 \leq y \leq 1$.

The metal mesh or felt or screen contemplated by the instant invention may assume a variety of structures when used as an interconnect or current collection device. The metal mesh can be expanded metal mesh or woven metal mesh, and may have any number of layers, dictated by the end use that one of ordinary skill in the art would be aware of. Preferably the number of layers is under six. The shape of the mesh structure may vary, and include square, diamond, rectangular or other. The interconnect or current collection device may also comprise a composite of a felt or mesh and a foil. It is contemplated that the current collection device have a metal screen, a metal mesh or metal felt that comprises iron and/or chromium. Preferably the metal screen, mesh or felt is an iron based ferritic steel.

It is preferred that the coating be A current collection device as claimed in claim 1, wherein the perovskite is doped or undoped $La_{1-x}Sr_xCrO_3$, where $0.1 \leq x \leq 0.5$ or $LaCrO_3$. Preferred is doped or undoped $LaCrO_3$, and more preferably that $LaCrO_3$ be doped. Dopants may be any of those commonly known in the art for $LaCrO_3$.

The coating on the metal screen, mesh or felt according to the instant invention may take various forms. The coating may a coating that may or may not impregnate the metal mesh, and may impregnate to various degrees. The coating may coat both sides of the mesh, and impregnate the mesh. The coating may coat the mesh on both sides and not impregnate the mesh. When the perovskite coating connects at least one cell of an electrochemical device to at least one other cell, this is to mean that the other cell may be in the same electrochemical device or in a different electrochemical device. The interconnects 108 allow current generated in the cells to flow between cells and be collected for use. These interconnects are typically formed into manifolds through which fuel and air may be supplied to the respective electrodes (allow lateral movement of gas in channels; but not allow intermixing of gas (vertical movement)). Due to the highly exothermic combustion resulting from an uncontrolled mixture of hydrogen and oxygen, it is essential that the interconnect manifolds by well-sealed at all edges of the planer cell. Moreover, due to required operating temperatures in excess of 900° C. (e.g., 950° C.) for conventional devices, the interconnect in contact with the air electrode may not be made of metal due to high temperature corrosion.

Prior designs for solid state electrochemical planar stack devices have used ceramic materials such as lanthanum chromite to form interconnects. However, lanthanum chromite is a very expensive material, sometimes accounting for as much as 90% of the cost of a device. In addition, it is a relatively brittle material (relative to metal); less than ideal for an application requiring an absolute seal, and is significantly less conductive than metal, resulting in resistive losses that reduce the overall efficiency of the device. These problems have combined to make current planar stack implementations impractical for commercial applications.

Figure 2A:
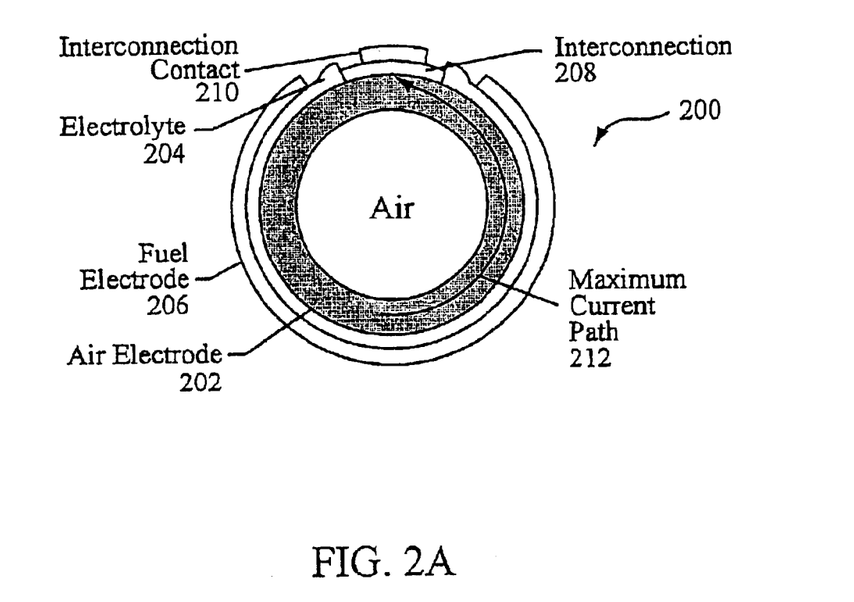
FIGS. 2A, B and C depict a tubular design for a solid state electrochemical device.
Figure 2B:
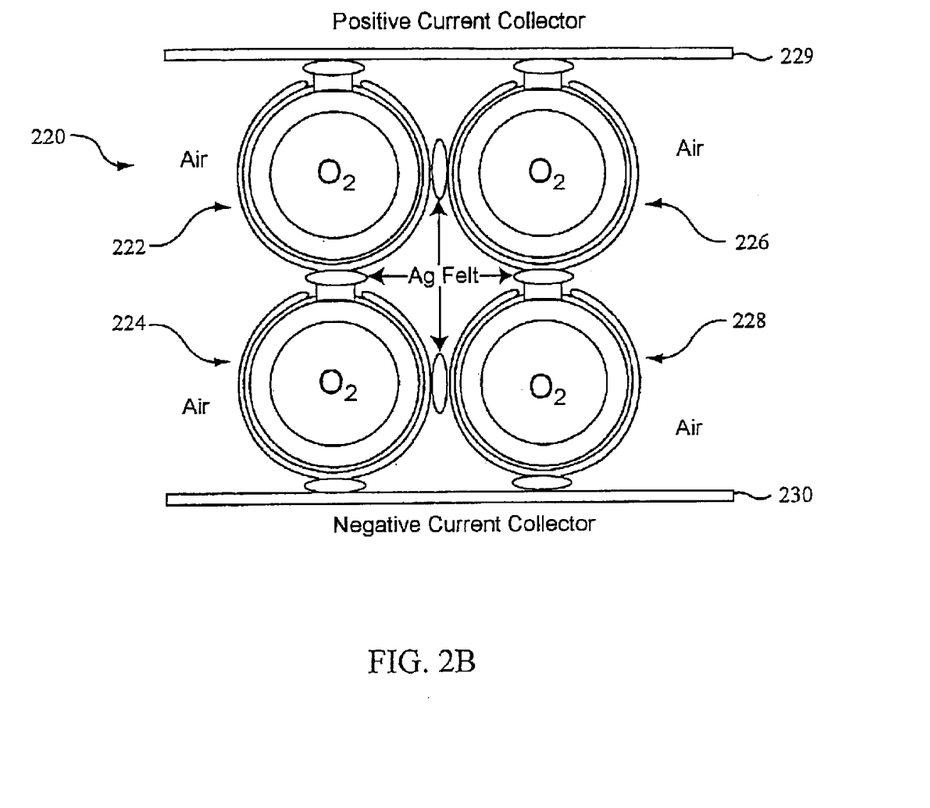
Figure 2C:
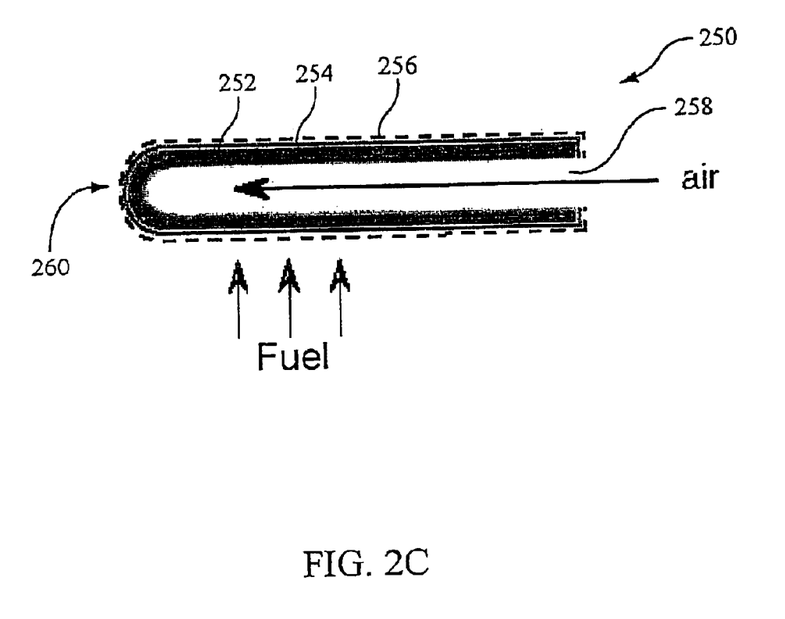

An alternative solid state electrochemical device design generally recognized as having much reduced safety concerns and greater reliability is depicted in FIGS. 2A–C. This design, commercialized by Westinghouse, for example, has a tubular shape. FIG. 2A depicts an axial cross-sectional view of a tubular SOFC 200. The inner tube is the air electrode 202, again formed from a solid ceramic material such as LSM. The air electrode 202 is coated with a solid electrolyte 204 for most of its circumference. The electrolyte is coated with the fuel electrode 206. During operation, air is flowed through the interior of the tube, while fuel (generally methane that is reformed to hydrogen during operation of the cell) is provided outside the tube. In the case of the tubular SOFC, one of the major fabrication costs is associated with the deposition of the electrolyte film by conventional chemical vapor deposition-electrochemical vapor deposition (CVD-EVD) techniques.

In order to get current produced by the fuel cell out, an electrically conductive material in contact with the electrodes is required. The material must also provide a chemical barrier to prevent intermixing of the hydrogen fuel outside the tube and the air inside. An interconnect 208, is provided on the air electrode 202 over that portion of the circumference not covered by the electrolyte 204. The interconnect typically has an interconnect contact 210 attached to it. This arrangement also allows for the stacking of tubes, as illustrated in FIG. 2B, which depicts a stacked cell device 220 composed of four tubular cells 222, 224, 226, 228, in this case oxygen generation cells, but otherwise as described above, stacked and interconnected using the interconnects contemplated herein between a positive current collector 229 and a negative current collector 230.

FIG. 2C depicts a length-wise cross sectional view of a tubular solid state electrochemical device, such as depicted in FIG. 2A. The device 250 has a tubular shape formed by a porous air electrode (cathode) 252, and electrolyte 254, and a porous fuel electrode (anode) 256, in the case of an SOFC application of the device. The tube-shaped device has an open end 258 available for providing a gas reactant, such as air in the case of an SOFC (as shown), or extracting a gas product, such as oxygen in the gas of an oxygen generator, and a closed end 260 to contain and separate the gas inside the tube from that outside. In the case of a SOFC, the fuel gas, e.g., hydrogen or methane, is typically provided outside the tube.

In this design, the seal preventing intermixing of reactant gasses, such as hydrogen fuel and air in a SOFC, are much more easily implemented. Rather than requiring a seal around all the edges, as in a planer device, the tubular device need only be sealed at the open end 258 of the tube (or can even be seal-less and allowed to leak). Moreover, this end may be located out of the hot zone of the operational device. This makes the seal easier to maintain and thus renders the device more safe and reliable than conventional planar designs.

However, the tubular design has the significant drawback that current collection for the whole tube occurs at only a small area on the circumference of the tube. Referring to FIG. 2A, all current coming from all around the tube gets collected at the interconnect 208. Thus, the maximum current path 212 is about half the circumference of the tube, which may be centimeters as opposed to microns as in the case for the planar implementation. The resistive loss inherent to this design in conventional implementations can be more fully appreciated with reference to FIG. 2B where a tubular device stack is shown. Each cell in the stack contributes to a very large total internal resistance for the device 220. As a result, the tubular implementation has much lower power density than the planar devices, making the development of high power density devices using this design impractical. In addition, this design retains the drawback of being composed of materials (ceramic electrodes and interconnects) that contribute significantly to the device's internal resistive losses, thereby limiting power density. Using the interconnects contemplated herein, solves the above stated problems.

While the designs depicted and described in FIGS. 1 and 2A–C are intended for use as a SOFC, the same or a similar device designs might also be used for gas separation or generation depending on the selection of materials used as the electrodes and separators, the environment in which the device is operated (gases supplied at each electrode), pressures or electrical potentials applied, and the operation of the device. For example, as described above, for a fuel cell, a hydrogen-based fuel (typically methane that is reformed to hydrogen during operation of the device) is provided at the fuel electrode and air is provided at the air electrode. Oxygen ions ($O^{2-}$) formed at the air electrode/electrolyte interface migrate through the electrolyte and react with the hydrogen at the fuel electrode/electrolyte interface to form water, thereby releasing electrical energy that is collected by the interconnect/current collector.

In the case of the fuel cell, the electrolyte can be composed of a solely ionic conducting material, such as yttria stabilized zirconia (YSZ). If the same device is operated as an electrolytic device, that is, rather than getting energy out of the device, energy is provided to the device as a potential applied across the two electrodes, ions formed from gas (e.g., oxygen ions from air) at the cathode will migrate through the electrolyte (which is selected for its conductivity of ions of a desired pure gas) to produce pure gas (e.g., oxygen) at the anode. If the electrolyte is a proton conducting thin film (for example, doped $BaCeO_3$, doped $SrCeO_3$ or doped $SrZrO_3$) instead of an oxygen ion conductor, the device could be used to separate hydrogen from a feed gas containing hydrogen mixed with other impurities, for instance resulting from the steam reformation of methane ($CH_4 + H_2O = 3H_2 + CO$). Protons (hydrogen ions) formed from the $H_2/CO$ mixture at one electrode/thin film interface could migrate across the thin film driven by a potential applied across the electrodes to produce high purity hydrogen at the other electrode. Thus the device may operate as a gas generator/purifier.

Such a device could also function as a electrochemical syn gas generator. Syn gas ($H_2 + CO$) is a valuable product used for synthesis of higher value organics. It is typically produced by the partial oxidation of methane with pure oxygen. Since the pure oxygen must be separated from air in a separate process, syn gas production is relatively expensive. In this case, the feed to the fuel electrode is methane, and air is supplied to cathode, as with the fuel cell. However, the device is run at a current density where methane is only partially oxidized to $H_2$ and CO, as opposed to deep oxidation in typical fuel cell operation to produce $H_2O$ and $CO_2$.

If the solely ionic conducting electrolyte is replaced with a mixed ionic electronic conducting (MTEC) membrane, such as LSMCF and instead of applying a potential across the electrodes, air at high pressure is provided on one side of the membrane, oxygen ions formed from the air at the membrane will migrate through the membrane to produce pure oxygen at the other side of the membrane. Thus the device may operate as an oxygen gas separator.

The ability to operate solid state electrochemical devices at temperatures below 800° C. provided by the present invention is an important advantage over conventional technology. At such operating temperatures, metals may be used to fabricate components of devices, including substrates and electrodes, as described above, and also importantly interconnects. The ability to use the interconnects described herein rather than ceramics such as lanthanum chromite for interconnects makes sealing of electrochemical devices much easier. The interconnects described herein are much easier to machine than ceramics, and may be worked with in conventional ways to form good seals and electrical contacts, such as by welding, brazing, etc. Thus, planar electrochemical device designs, with all their low internal resistance characteristics, may be made economically feasible and reliable.

Moreover, the material cost of metal is much lower than the rare earth elements that go into the ceramic and cermet materials they replace. Metals also have higher thermal conductivity than ceramics or cermets which results in results in lower heat-related stresses and reduces the need for cooling with excess gas. And metals have higher electrical conductivity, resulting in decrease internal resistance and therefore improved performance of solid state electrochemical devices. Metals are less brittle and therefore less susceptible to catastrophic failure than ceramics allowing the fabrication of larger cells and devices.

The techniques described herein, and the structures they produce may be used in the fabrication of a variety of electrochemical devices, as described above, to reduce cost, improve performance and reliability, and reduce operating temperature for an efficient device. It should be understood that the fabrication techniques and structures described herein may be implemented in either planar or tubular solid state electrochemical device designs.

Conclusion

Although the foregoing invention has been described in some detail for purposes of clarity of understanding, those skilled in the art will appreciate that various adaptations and modifications of the just-described preferred embodiments can be configured without departing from the scope and spirit of the invention. Moreover, the described processing distribution and classification engine features of the present invention may be implemented together or independently. Therefore, the described embodiments should be taken as illustrative and not restrictive, and the invention should not be limited to the details given herein but should be defined by the following claims and their full scope of equivalents.

What is claimed is:

1. A current collection device capable of collecting current in an electrochemical cell comprising: a metal screen, mesh or felt coated with a composition comprising a perovskite.

2. A current collection device as claimed in claim 1, wherein the metal screen, mesh or felt comprises iron and/or chromium.

3. A current collection device as claimed in claim 1 or 2, wherein the metal screen, mesh or felt is an iron based ferritic steel.

4. A current collection device as claimed in claim 1, wherein the perovskite is $LaCrO_3$.

5. A current collection device as claimed in claim 4, wherein the $LaCrO_3$ is doped.

6. A current collection device as claimed in claim 1, wherein the perovskite is $La_{1-x}Sr_xCrO_3$, where $0.1 \leq x \leq 0.5$.

7. A current collection device as claimed in claim 1, wherein the perovskite coated metal screen, mesh or kit connects at least one cell of an electrochemical device to at least one other cell.

8. A current collection device as claimed in claim 7, wherein the cells are in the same electrochemical device.

9. An electrochemical cell comprising the current collection device of claim 1.

10. An array of electrochemical cells connected by the current collection device as claimed in claim 1.

11. A solid state electrochemical device comprising:
   a current collection device as claimed in claim 1.

12. A solid oxide fuel cell comprising:
   a current collection device as claimed in claim 1.

13. A gas speration device comprising:
   a current collection device as claimed in claim 1.

14. An interconnect for an electrochemical device comprising:
   a metal screen, mesh or felt, having coated thereon
   a thin oxide film.

15. An interconnect as claimed in claim 14, wherein the metal screen, mesh or felt comprises chromium.

16. An interconnect as claimed in claim 14, wherein the thin oxide film is comprised substantially of $LaCrO_3$.

17. An interconnect as claimed in claim 16, wherein the $LaCrO_3$ is doped.

18. An interconnect as claimed in claim 14, wherein the oxide is an oxide of the formula $$A_{1-x}A'_xB_{1-y}B'_yO_3$$

wherein A is a Lanthanide series element, A' is Ba, Ca or Sr, B is Cr and B' is chosen from the following elements: Fe, Co, Ni, Cu, V, Ti, Mn, Ce, Ta, In, and Al, and where $0 \leq x \leq 1$ and $0 \leq y \leq 1$.

19. An interconnect as claimed in claim 18, wherein $0.1 \leq x \leq 0.5$ and $0.1 \leq y \leq 5$.

* * * * *